United States Patent
Tuyeras et al.

(10) Patent No.: US 9,030,163 B2
(45) Date of Patent: May 12, 2015

(54) ENERGY RECHARGING DEVICE FOR A VEHICLE

(75) Inventors: Gaëtan Tuyeras, Chavanoz (FR); Olivier Jean Georges Chantal, Acheres (FR); Jean-Paul Moskowitz, Paris (FR); Mohammed Leouatni, Clichy (FR); Angel Garcia Marne, Barcelona (ES)

(73) Assignee: Alstom Transport SA, Levallois-Perret (FR)

( * ) Notice: Subject to any disclaimer, the term of this patent is extended or adjusted under 35 U.S.C. 154(b) by 180 days.

(21) Appl. No.: 13/495,179

(22) Filed: Jun. 13, 2012

(65) Prior Publication Data

US 2013/0106349 A1    May 2, 2013

(30) Foreign Application Priority Data

Jun. 14, 2011    (FR) .................................... 11 55167

(51) Int. Cl.
| | | |
|---|---|---|
| *H02J 7/00* | (2006.01) | |
| *B60L 5/20* | (2006.01) | |
| *B60L 5/42* | (2006.01) | |
| *B60M 1/36* | (2006.01) | |
| *B60L 11/18* | (2006.01) | |

(52) U.S. Cl.
CPC ... *H02J 7/00* (2013.01); *B60L 5/20* (2013.01); *B60L 5/205* (2013.01); *B60L 5/42* (2013.01); *B60M 1/36* (2013.01); *B60L 11/1837* (2013.01)

(58) Field of Classification Search
CPC . Y02T 90/14; Y02T 10/7005; Y02T 10/7088; Y02T 90/121; Y02T 90/163; Y02T 90/16; H01M 8/04925; H02J 13/0079
USPC .................................. 320/107, 108, 109, 137
See application file for complete search history.

(56) References Cited

U.S. PATENT DOCUMENTS

| 2009/0153099 A1* | 6/2009 | Mahawili ....................... 320/109 |
| 2010/0060016 A1* | 3/2010 | Hunter ............................ 290/1 R |
| 2010/0102775 A1* | 4/2010 | Chander et al. ............... 320/109 |

(Continued)

FOREIGN PATENT DOCUMENTS

| DE | 39 14 675 A1 | 11/1990 |
| EP | 0968873 A1 | 1/2000 |

(Continued)

OTHER PUBLICATIONS

An International Search Report, mailed Feb. 1, 2012, which issued during the prosecution of International Application No. FR1155167, which corresponds to the present application.

*Primary Examiner* — Brian Ngo
(74) *Attorney, Agent, or Firm* — McDermott Will & Emery LLP

(57) ABSTRACT

The object of the invention is a device for recharging with energy a piece of storage equipment loaded on-board a vehicle comprising at least one power supply device external to the vehicle, at least one power collector fixed on the vehicle, the power collector comprising a central portion provided with at least one friction strip, intended for powering the vehicle when the vehicle is moving, the central portion being laterally extended with at least one horn formed in one piece in a metal material and forming an upper surface. At least one portion of the upper surface of the horn forms a contact area capable of directly coming into contact with a corresponding contact surface of the power supply device when the vehicle is at a standstill in a stop station in order to ensure energy transfer between the power collector and the power supply device via the contact area.

10 Claims, 4 Drawing Sheets

(56) References Cited

U.S. PATENT DOCUMENTS

| | | | |
|---|---|---|---|
| 2010/0191585 A1* | 7/2010 | Smith | 705/13 |
| 2011/0074350 A1* | 3/2011 | Kocher | 320/109 |
| 2011/0074351 A1* | 3/2011 | Bianco et al. | 320/109 |
| 2011/0115425 A1* | 5/2011 | Olsson | 320/101 |

FOREIGN PATENT DOCUMENTS

| | | |
|---|---|---|
| EP | 2275300 A1 | 1/2011 |
| WO | WO 2004/020241 | 3/2004 |

* cited by examiner

ENERGY RECHARGING DEVICE FOR A VEHICLE

CROSS REFERENCE TO RELATED APPLICATIONS

The present application claims priority under 35 U.S.C. §119 to French Patent Application No. 1155167, filed on Jun. 14, 2011, which is incorporated herein by reference.

The present invention relates to a device for recharging with energy a piece of storage equipment loaded on-board a vehicle, comprising at least one power supply device exterior to the vehicle, at least one power collector fixed on the vehicle, the power collector comprising a central portion provided with at least one friction strip, intended for powering the vehicle when the vehicle is moving, the central portion being laterally extended with at least one horn formed in one piece in a metal material and forming an upper surface.

Such recharging devices are notably used for railway vehicles and urban transportation electrical vehicles such as trams or trolley buses, which are self-powered over the whole or part of their travel. Indeed, more and more operators of these lines do not desire catenaries in their city centre, which degrade the esthetics of the neighborhoods.

In this case, it is possible to provide recharging of the energy of the vehicles when the latter are stopped in a station by static contact between friction strips of the pantograph of the vehicle and an electric power supply line. Such recharging in a station is carried out for a duration at most equal to the one set for embarkation and disembarkation of the passengers, typically between 15 and 30 seconds. This duration should be as short as possible in order not to unnecessarily increase the trip duration of the vehicle. Recharging a device for storing electric energy, such as a battery or a set of super capacitors presently having a power of about a few hundred kW taking into account the size limitations imposed by the vehicle, within a short time not exceeding 30 seconds, requires the availability of a recharging device allowing such power to be exchanged without deteriorating the constitutive portions of the device because of overheating or any risk for the users.

Now, power collectors from the prior art are designed in order to collect power with a sliding contact. Indeed, the carbon of the friction strips of a pantograph is used for its wear resistance and electricity conduction properties. However, carbon is not a sufficiently good electric conductor for withstanding for a period of several seconds a current transfer of several thousands of amperes without heating to temperatures generally leading to its destruction: the sliding contact is therefore necessary in order to avoid overheating of the materials in contact.

One of the purposes of the present invention is to provide an electric power recharging device allowing the recharging of energy storage equipment on-board a vehicle without having the drawbacks of the devices of the prior art and without inducing heating processes which cause deterioration or even destruction of the components making it up. More specifically it aims at improving energy transfers during the recharging when the vehicle is at a standstill.

For this purpose, the object of the invention is an energy-recharging device of the aforementioned type, characterized in that at least one portion of the upper surface of the horn forms a contact area able to come directly in contact with a corresponding contact surface of the power supply device when the vehicle is at a standstill in a stop station in order to ensure energy transfer between the power collector and the power supply device via the contact area.

The energy-recharging device according to the invention may also comprise one or several of the following characteristics, taken individually or according to any one or the totality of technically possible combinations:

- the upper surface of the horn is continuous at least in and in the vicinity of the contact area;
- the horn is made in a material having high heat and electric conductivities, such as aluminum, copper, gold or silver;
- the position of the contact area along the upper surface of the horn is variable, the contact area being defined, in each stop station, as the upper surface area facing corresponding contact surface of the power supply device when the vehicle is at a standstill in a stop station;
- the horn comprises a horizontal area substantially in the alignment of the central portion and an inclined area;
- the contact area is formed by a portion of the upper surface of the horizontal area and/or by a portion of the upper surface of the inclined area;
- the horn is assembled to onto the central portion;
- the power collector is a pantograph comprising two bows;
- each bow comprises a central portion laterally extended with two horns positioned on either side of the central portion, each horn being able to cooperate with a power supply device; and
- the horn is formed by means for guiding a catenary during the displacement of the vehicle.

The invention will be better understood upon reading the following description, given only as an example and made with reference to the appended drawings, wherein.

Figure 1:
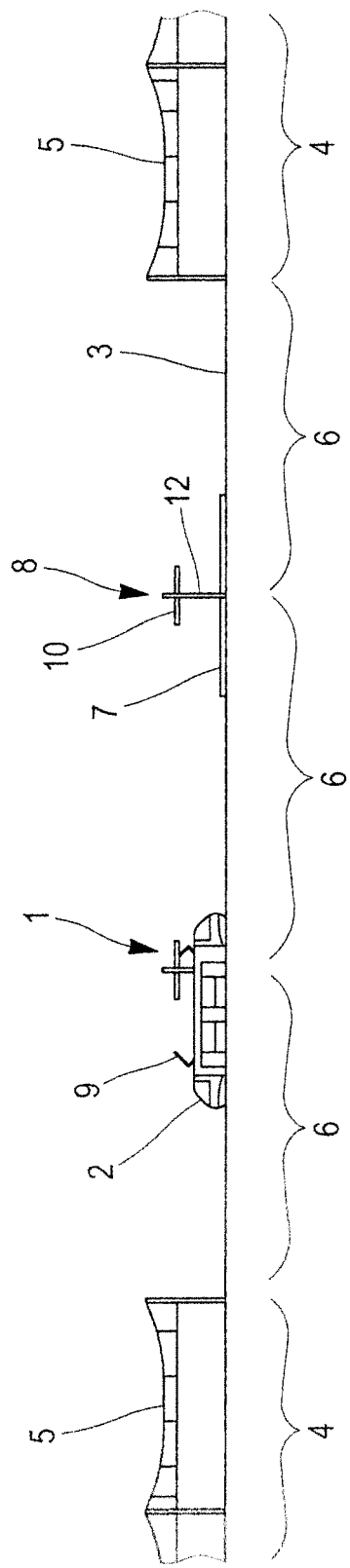
FIG. 1 is a schematic view of the implementation of a recharging device according to the invention on a running track.
Figure 2:
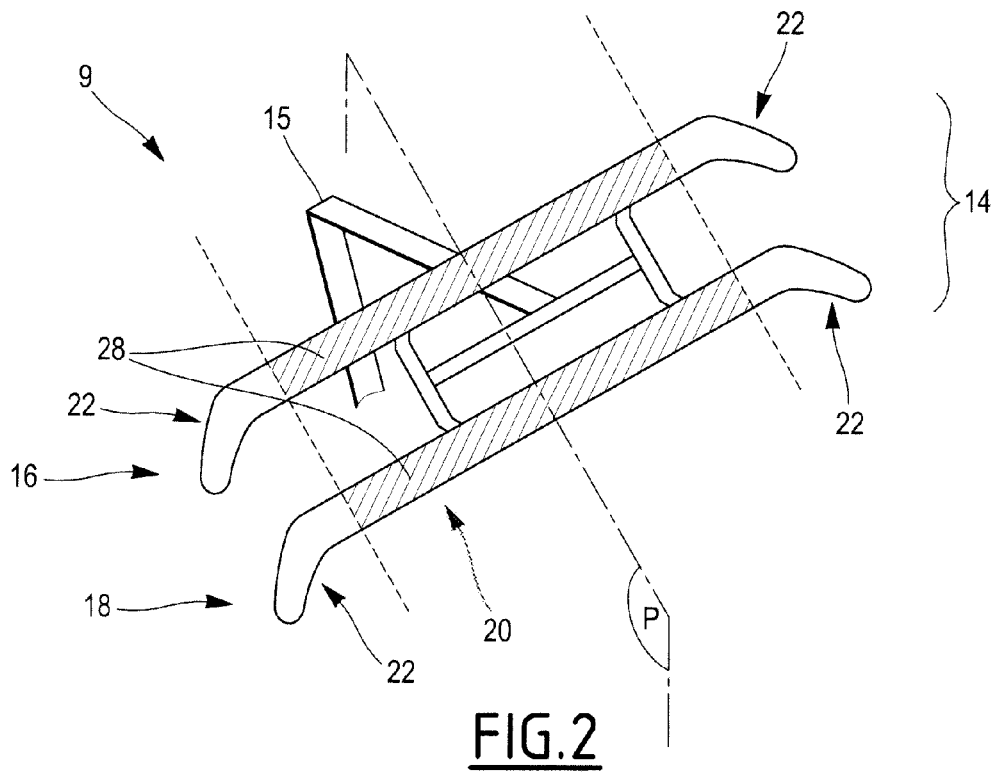
FIG. 2 is a schematic perspective view of a power collector of the recharging device of FIG. 1.
Figure 3:
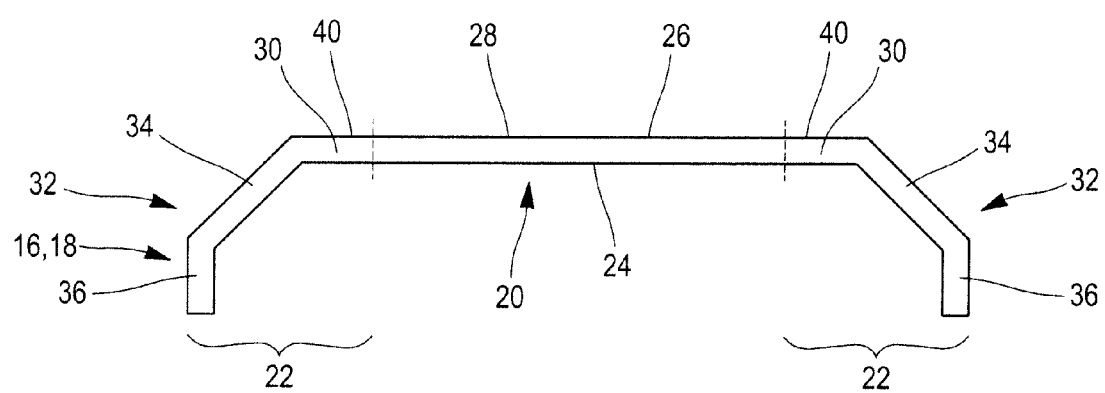
FIG. 3 is a schematic sectional view transversely to the running track of one portion of the power collector of FIG. 2.

FIG. 1 represents a schematic view of the implementation of a recharging device 1 according to the invention for a vehicle 2 circulating on a track 3 comprising portions 4 supplied with electric power by catenaries 5 and portions 6 not supplied with electric power. Stop stations 7 of the vehicle 2 are laid out along the track 3. The stop stations 7 for example correspond to stations, in which the vehicle 2 may stop for allowing embarkation and disembarkation of passengers. Some stop stations 7 are located in the portions 6 not supplied with electric power, other stop stations 7 are located in portions 4 supplied with electric power.

The vehicle 2 is notably a railway vehicle or an urban transportation electric vehicle such as a tram or a trolley bus.

When it circulates in the portions 4 supplied with electric power by the catenaries 5, the vehicle 2 is supplied with electric power by putting friction strips of a pantograph of the vehicle 2 in contact with the catenary 5. When it circulates in portions 6 not supplied with electric power, the vehicle 2 consumes the electric energy stored in storage equipment, for example batteries or assemblies of supercapacitors, loaded on-board the vehicle 2. The recharging device 1 according to the invention is able to ensure recharging of this storage equipment with energy when the vehicle is at a standstill in a stop station 7.

The recharging device 1 comprises a power supply device 8 exterior to the vehicle 2 and a power collector 9 positioned on the vehicle 2. The power collector 9 is able to come into contact with the power supply device 8 when the vehicle 2 is at a standstill in a stop station 7 in order to ensure energy exchange between the power collector 9 and the power supply device 8 so as to recharge the equipment for storing energy loaded on board the vehicle 2, the power collector 9 being electrically connected to said storage equipment.

The power supply device 8 is laid out at the stop stations 7 located in portions 6 not supplied with electric power or at stop stations 7 located in portions 4 supplied with electric power. Advantageously, it is located in a portion 6 not supplied with electric power. For its power supply, it is connected to a substation of a known type (not shown) which distributes the electric power from an electric power distribution network. The power supply device 8 for example distributes a DC voltage of 750 volts.

In the embodiment illustrated, the power supply device 8 is an overhead power supply device. It comprises at least one rigid catenary segment 10 able to cooperate with the power collector 9 of the vehicle 2 when the vehicle 2 is at a standstill at a stop station 7. According to an embodiment (FIGS. 4 and 6), it comprises two rigid catenary segments 10, able to each cooperate with the power collector 9 of the vehicle 2 and positioned on either side of the running track 3, notably symmetrically with respect to the track 3. Each rigid catenary segment 10 is for example mounted on a post 12 implanted on the side of the track 3 in the stop station 7. Alternatively, the rigid catenary segments 10 are mounted on a same post 12 implanted at the side of the track 3 in the stop station 7.

In the illustrated embodiment, the power collector 9 is a pantograph positioned on the roof of the vehicle 2. As illustrated in FIGS. 2 to 7, this power collector 9 includes a simple or multiple head 14 and a jointed structure 15 capable of displacing the head 14 between an energy pickup position, in which the head 14 is in contact with the rigid catenary segments 10 of the power supply device 8 and an insulation position, in which the head 14 is at a distance from the power supply device 8, folded on the roof of the vehicle 2.

The head 14 comprises two bows 16, 18 (FIG. 2) substantially parallel to each other. The bows 16, 18 extend along an extension direction perpendicular to the extension direction of the vehicle 2 and to the track 3. Subsequently in the description, the extension direction of the bow 16, 18 is called a lateral direction. Each bow 16, 18 is symmetrical relatively to a middle plane P perpendicular to the lateral direction.

Each bow 16, 18 comprises a central portion 20 extended laterally at each of its ends by an end portion or horn 22 extending along the lateral direction. Thus, each bow 16, 18 comprises two horns 22 located on either side of the central portion 20. The horns 22 are assembled with the central portion 20, notably by screwing or bolting, in order to form the bow 16, 18. The horn 22 forms a means for guiding the catenary 5 relatively to the power collector 9 capable of avoiding that the catenary 5 passes under the head 14 of the power collector 9, notably upon passing a switch. During normal operation, i.e. when the vehicle 2 runs along a rectilinear track portion 3, the horns 22 are not intended to come into contact with the catenary 5.

The central portion 20 is substantially rectilinear. It extends substantially horizontally. It comprises a lower surface 24 oriented towards the roof of the vehicle 2 and an upper surface 26 opposite to the lower surface 24. At least one portion of its upper surface 26 is formed by a friction strip 28. This friction strip 28 is typically made of carbon. When the vehicle 2 moves along the portion 4 of the track 3 provided with a catenary 5, the friction strips 28 of the power collector 9 are able to come into contact with the catenary 5 so as to ensure energy transfer between the catenary 5 and the power collector 9 when the vehicle 2 is running. The contact between the catenary 5 and the friction strips 28 of the power collector 9 is sliding and is effected when the vehicle 2 is moving. The material used for forming the friction strips 28 is adapted for optimized pickup of power without heating beyond the critical threshold when the contact is frictional i.e. the vehicle 2 is moving along the catenary 5.

Each horn 22 comprises a horizontal area 30 substantially extending in the alignment of the central portion 20 and an inclined area 32 forming a non-zero angle with the horizontal area 30. The inclined area 32 is inclined downwards relatively to the central portion 20 and relatively to the horizontal area 30. It comprises a substantially rectilinear proximal segment 34 inclined downwards and away from the central portion 20, extended with a substantially vertical distal segment 36. Such a shape is adapted to the guiding as described above.

Each horn 22 is formed in a single piece in a metal material. The metal material used is a material having high heat and electric conductivities, and notably a heat conductivity of more than 100 $W \cdot m^{-1} K^{-1}$. It is notably made in a material such as copper, aluminum, gold, silver or alloys of these materials. The horn 22 formed in a single piece defines an upper surface 40. At least one portion of this upper surface 40 forms a contact area 42, capable of directly coming into contact with a corresponding contact surface 44 of the power supply device 8 when the vehicle 2 is at a standstill in a stop station 7 in order to ensure energy transfer between the power collector 9 and the power supply device 8.

The contact between the contact area 42 and the power supply device 8 may be achieved in several ways, for example in a contact point (point-like contact), in a contact line (line contact) or in a contact surface (surface contact). According to an embodiment, the contact is a surface contact.

<<Direct>> contact means that no element added on the horn 22 is interposed between the upper surface 40 and the surface 44 of the power supply device 8. Upon contact between the contact surface 44 of the power supply device 8 and the contact area 42 of the power collector 9, the metal forming the horn 22 directly contacts, i.e. without interposition of another material, the contact surface 44 of the power supply device 8.

The upper surface 40 is a substantially continuous surface at least at the contact area 42 and in the vicinity of the latter, i.e. it does not have any sharp edge at least at the contact area 42 and in the vicinity of the latter. Optionally, the upper surface 40 is continuous over the whole of its length.

The portion of the upper surface 40 forming the contact area 42 does not have any structural difference with the remainder of the upper surface 40.

The position of the contact area 42 on the upper surface 40 is variable. It depends on the localization of the contact surface 44 with which it is intended to cooperate when the vehicle 2 is stopped at the corresponding power supply device 8. For each stop station 7, the contact area 42 corresponds to the portion of the upper surface 40 facing the contact surface 44 when the vehicle 2 is stopped in the stop station 7. The dimensions of the contact area 42 substantially correspond to the dimensions of the contact surface 44 so as to maximize energy transfer between the power collector 9 and the power supply device 8 via the contact area 42 when the vehicle 2 is at a standstill.

Each rigid catenary segment 10 is capable of cooperating with the contact areas 42 of each of the two bows 16, 18 located on the same side of the track 3. Each rigid catenary segment 10 is therefore capable of cooperating with two contact areas 42.

Figure 4:
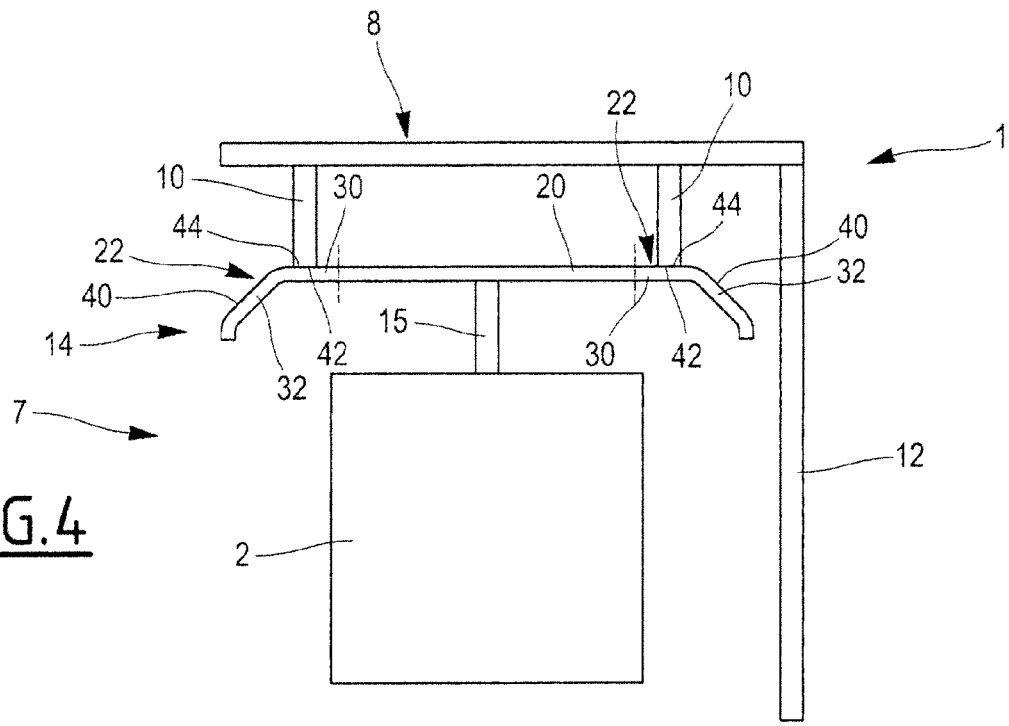
FIG. 4 is a schematic sectional view transversely to the running track of the recharging device according to a first embodiment.

According to a first embodiment of the recharging device 1 illustrated in FIG. 4, the contact surface 44 of the rigid catenary segment 10 is positioned so that the contact area 42 is formed by a portion of the upper surface 40 of the horizontal area 30 of the horn 22.

Figure 6:
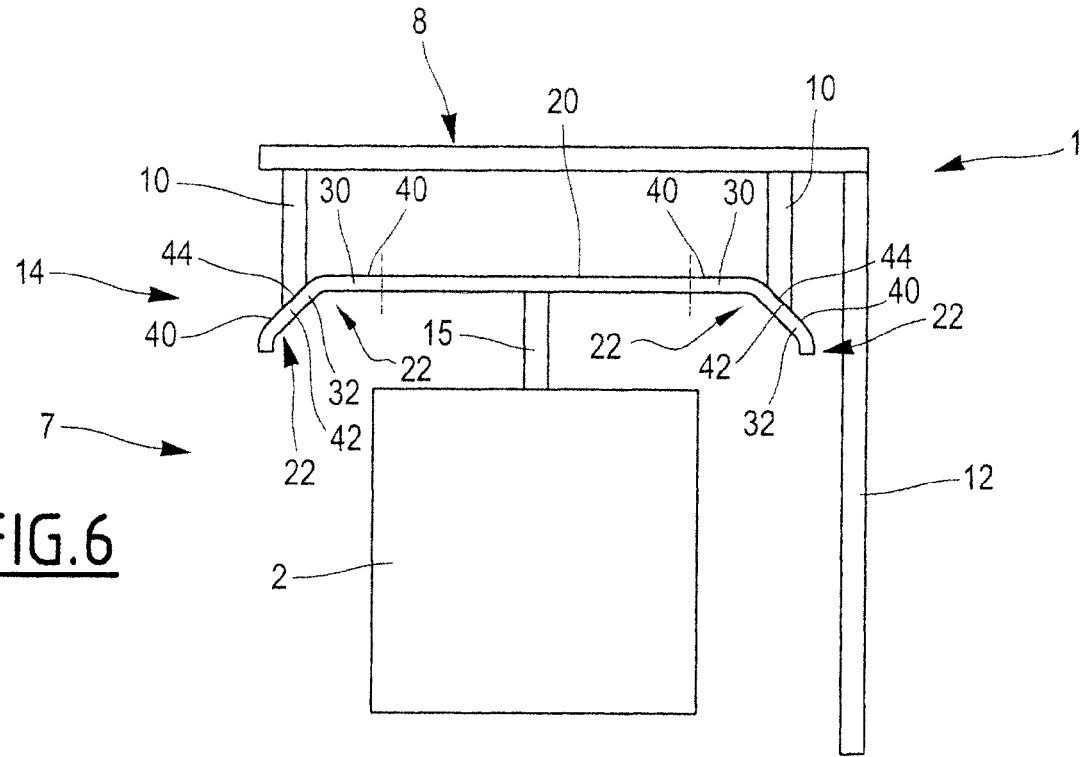
FIG. 6 is a schematic view analogous to FIG. 4 of a recharging device according to a second embodiment.

According to a second embodiment illustrated in FIG. 6, the contact surface 44 of the rigid catenary segment 10 is positioned so that the contact area 42 is formed by a portion of the upper surface 40 of the inclined area 32 of the horn 22.

When the vehicle 2 stops in a station 7, it deploys the power collector 9 by means of the jointed structure 15 so as to put the contact areas 42 of the head 14 in contact with the contact surfaces 44 of the rigid catenary segments 10 located at the vertical of the contact areas 42. Energy transfer is then carried out between the power collector 9 and the power supply device 8 via the contact areas 42. An energy transfer area is thus obtained at each of the contact areas 42. This energy transfer is a static transfer i.e. it is carried out at a standstill.

At a standstill, the electric path is thus the following: from the substations distributing electric power towards the rigid catenary segments 10 and the contact surfaces 44, from the contact surfaces 44 towards the contact areas 42 by the contact between the contact surfaces 44 and the contact areas 42, and then from the contact areas 42 along the bows 16, 18 as far as an area for connection to a power supply cable (not shown) of the vehicle 2 electrically connected to the energy storage equipment of the vehicle 2.

Figure 5:
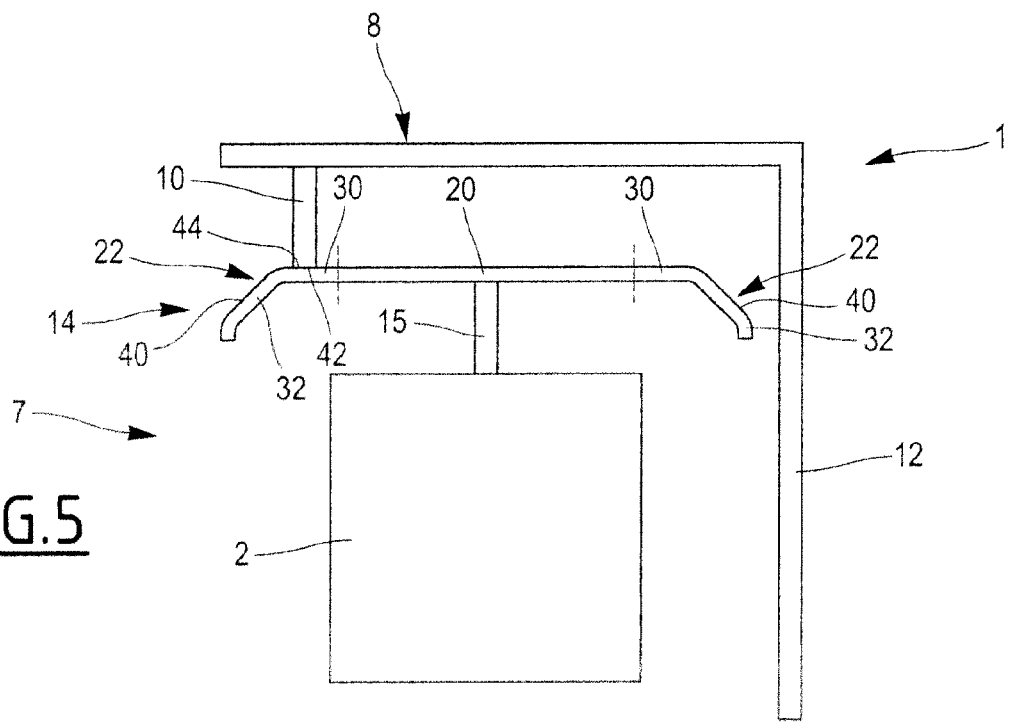
FIG. 5 is a schematic view analogous to FIG. 4 of a recharging device according to an alternative of the first embodiment.
Figure 7:
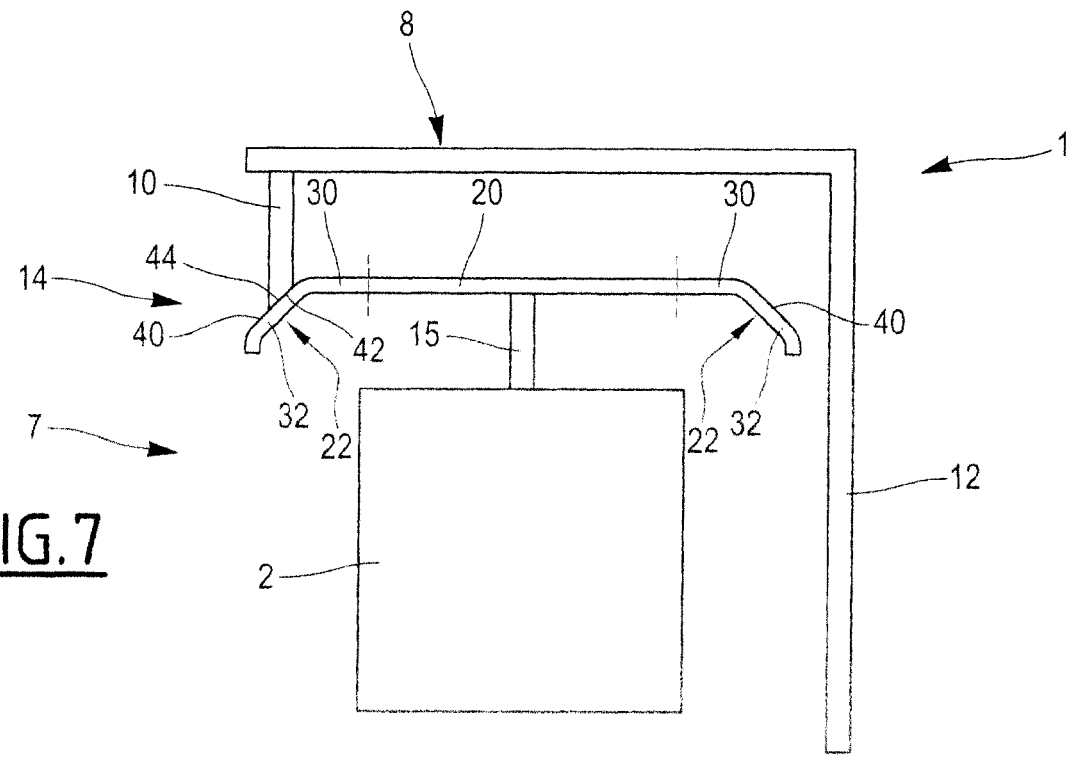
FIG. 7 is a schematic view analogous to FIG. 4 of a recharging device according to an alternative of the second embodiment.

FIGS. 5 and 7 respectively illustrate alternatives of the first and second embodiments, the only difference of which with the first and second embodiments is that the power supply device 8 only comprises one rigid catenary segment 10 positioned on one side of the running track 3 instead of two rigid catenary segments 10 positioned on either side of the track 3. The contact surface 44 of the rigid catenary segment 10 is capable of coming into contact with a contact area 42 of a horn 22 of the power collector 9 located on the same side of the track 3 as the catenary segment 10, the contact area 42 being at the vertical of the surface 44 when the vehicle is at a standstill in the corresponding stop station. Only one horn 22 of each bow 16, 18 is therefore capable of coming into contact with the power supply device 8. Therefore in these alternatives, there is only one energy transfer area at each bow 16, 18. This area is located on a single side of the track 3, i.e. the side of the track 3 where the rigid catenary segment 10 is positioned. This configuration is simpler to achieve, more economical in materials than the one according to the first and second embodiments (FIGS. 4 and 6). On the other hand, the configuration according to the first and second embodiments is preferable mechanically (better distribution of the mechanical forces because of the symmetry in the bearing areas between the power supply device 8 and the power collector 9) and allows larger energy transfers because of the doubling of the possible transfer surface area.

In the invention, the horns of the head, which are customarily used only for guiding the catenary, are used for ensuring a new function, i.e. the power supply function for vehicles at a standstill. The energy transfer is directly accomplished between the horns of the head and the power supply device and does not require structural modification of the existing pantographs already mounted on the vehicles. The invention thus provides a simple and inexpensive recharging system when the vehicle is at a standstill, since it simply requires that adapted power supply devices be available in the stop stations. The invention thus proposes a bimodal pantograph capable of being supplied with energy both when the vehicle is running via the sliding contact achieved between the catenary and the friction strips in the central portion of the bows and when it is at a standstill via the contact between the horns and the power supply device, without complicating the kinematics of the pantograph (these are always the known movements of deployment and folding back of the head), or requiring additional components.

The recharging system according to the invention is further particularly flexible. Indeed, as it is not necessary to add elements assembled to onto the horn for forming the contact surface, the entirety of the upper surface of the horn may form the contact area, since the whole horn is formed in a single piece in the same metal material. As was explained earlier, at each stop station, the position of the contact area on the horn is only defined by the layout of the contact surfaces of the power supply device. Thus, it is possible, for a same vehicle to provide in a first stop station, a layout of the contact surfaces leading to localization of the contact area in the horizontal portion of the horn and in a second stop station a localization of the contact area in the inclined portion of the horn. With this flexibility, it is for example possible to adapt in each stop station, the architecture of the power supply device to the particularities of the station, notably in terms of available space.

The recharging device according to the invention generates very good electric energy transfer between the power supply device and the power collector while avoiding excessive heating of the contact area of the power collector by means of the good heat and electric conductivity of the material forming the contact area. Indeed, even if electric energy transfer is accompanied by production of heat by the Joule effect in the horn of the pantograph, the produced heat is distributed by conduction through the horn and therefore no excessive localized heating of the contact area occurs.

The invention claimed is:

1. A device for recharging with energy a piece of storage equipment loaded on-board a vehicle comprising at least one power supply device external to the vehicle, at least one power collector fixed on the vehicle, the power collector comprising a central portion provided with at least one friction strip intended for powering the vehicle when the vehicle is moving, the central portion being laterally extended with at least one horn formed in one piece in a metal material and forming an upper surface, characterized in that at least one portion of the upper surface of the horn forms a contact area configured to directly come into contact with a corresponding contact surface of the power supply device when the vehicle is at a standstill in a stop station in order to ensure energy transfer between the power collector and the power supply device via the contact area.

2. The recharging device according to claim 1, characterized in that the upper surface of the horn is continuous at least in and in the vicinity of the contact area.

3. The recharging device according to claim 1, characterized in that the horn is made in a material having high heat and electric conductivities, such as aluminum, copper, gold or silver.

4. The recharging device according to claim 1, characterized in that the position of the contact area along the upper surface of the horn is variable, the contact area being defined, in each stop station, as the area of the upper surface facing the corresponding contact surface of the power supply device when the vehicle is at a standstill in the stop station.

5. The recharging device according to claim 1, characterized in that the horn comprises a horizontal area substantially in the alignment of the central portion and an inclined area.

6. The recharging device according to claim 5, characterized in that the contact area is formed by a portion of the upper surface of the horizontal area and/or by a portion of the upper surface of the inclined area.

7. The recharging device according to claim 1, characterized in that the horn is assembled to the central portion.

8. The recharging device according to claim 1, characterized in that the power collector is a pantograph comprising two bows.

9. The recharging device according to claim 8, characterized in that each bow comprises a central portion laterally extended with two horns positioned on either side of the central portion, each horn being capable of cooperating with a power supply device.

10. The recharging device according to claim 1, characterized in that the horn is formed by means for guiding a catenary during the displacement of the vehicle.

\* \* \* \* \*